> OR 3,854,751

United States Patent
Haas et al.

[11] 3,854,751
[45] Dec. 17, 1974

[54] METHOD FOR RAPIDLY SWITCHING A DISPLAY BY SEQUENTIAL APPLICATION OF ORTHOGONAL ELECTRIC FIELDS TO A LIQUID CRYSTAL MATERIAL HAVING OPTICAL PROPERTIES OF THE NEMATIC MESOPHASE

[75] Inventors: Werner E. L. Haas, Webster; James E. Adams, Ontario, both of N.Y.

[73] Assignee: Xerox Corporation, Stamford, Conn.

[22] Filed: Apr. 9, 1973

[21] Appl. No.: 349,497

[52] U.S. Cl.............................. 350/160 LC, 350/150
[51] Int. Cl................................................. G02f 1/28
[58] Field of Search............................. 350/160 LC

[56] References Cited
UNITED STATES PATENTS

| | | | |
|---|---|---|---|
| 3,551,026 | 12/1970 | Heilmeier | 350/160 LC X |
| 3,680,950 | 8/1972 | Haas et al. | 350/160 LC X |
| 3,711,713 | 1/1973 | Wysocki et al. | 350/160 LC X |
| 3,720,456 | 3/1973 | Adams et al. | 350/160 LC UX |

OTHER PUBLICATIONS

Buckingham et al. "The Addition of Optically Active Compounds to Nematic Liquid Crystals" Chem. Phys. Letters, Vol. 3, No. 7, pp. 540, 541. July 1969.
Melamed et al., "Selectal Optical Properties of Mixtures of Cholesteric Liquid Crystals" Applied Optics, Vol. 10, No. 5, pp. 1103–1107, May 1971.
Sussman, "Electrooptic Liquid Crystal Devices: Principles and Applications" IEEE Trans. on Parts, Hybrids, and Packaging, Vol. PHP-8, No. 4, pp. 24–37, Dec. 1972.

*Primary Examiner*—Edward S. Bauer
*Assistant Examiner*—Matthew W. Koren
*Attorney, Agent, or Firm*—James J. Ralabate; David C. Petre; George J. Cannon

[57] ABSTRACT

A liquid crystalline composition having optical uniaxiality is driven by electrical fields to alternate its optic axis between substantially normal positions of orientation. Imaging at speeds greater than 500 cycles per second are achieved with enhanced imaging contrast.

21 Claims, 3 Drawing Figures

3,854,751

METHOD FOR RAPIDLY SWITCHING A DISPLAY BY SEQUENTIAL APPLICATION OF ORTHOGONAL ELECTRIC FIELDS TO A LIQUID CRYSTAL MATERIAL HAVING OPTICAL PROPERTIES OF THE NEMATIC MESOPHASE

BACKGROUND OF THE INVENTION

This invention relates to electro-optic systems, and more specifically, to an electro-optic system wherein a liquid crystalline electro-optic composition is used. Furthermore, this invention includes electro-optic cells and imaging systems embodying the inventive liquid crystalline electro-optic system.

Recently, there has been substantial interest in the discovery of more useful applications for the class of substances known as "liquid crystals." The name "liquid crystals" has become generic to liquid crystalline materials which exhibit dual physical characteristics, some of which are typically associated with liquids and others which are typically unique to solids. Liquid crystals exhibit rheological characteristics, such as viscosities, which are normally associated with liquids. The optical characteristics of liquid crystals are more similar to those characteristics ordinarily unique to crystalline solids. In liquids or fluids, the molecules are typically randomly distributed and oriented throughout the mass of the material. Conversely, in crystalline solids the molecules are generally rigidly oriented and arranged in a specific crystalline structure. Liquid crystals resemble solid crystals in that the molecules of the liquid crystalline compositions are regularly oriented in a fashion analogous to, but less extensive than, the molecular orientation and structure in a crystalline solid. Many substances have been found to exhibit liquid crystalline characteristics in a relatively narrow temperature range; below the temperature range the substances typically appear as crystalline solids, and above the temperature range they typically appear as liquids. Liquid crystals are known to appear in three different mesomorphic forms; the smectic, the nematic and cholesteric. In each of these structures, the molecules are typically arranged in a unique orientation. In the nematic liquid crystalline mesophase structure, the major axes of the molecules lie approximately parallel to each other, but the molecules are typically not specifically organized in any other fashion.

Nematic liquid crystals are known to be responsive to electrical fields, and have been used in various electro-optic cells and imaging systems, for example as disclosed in Williams U.S. Pat. No. 3,322,485, Freund et al., U.S. Pat. No. 3,364,433; Heilmeier et al., U.S. Pat. No. 3,499,112; and Goldmacher et al., U.S. Pat. No. 3,499,702. Most of the known nematic liquid crystalline light valves and display devices make use of the dynamic light scattering characteristics of layers of nematic liquid crystalline materials which have electrical fields placed across the thickness of the layer.

In the smectic structure the molecules are arranged in layers with their major axes approximately parallel to each other and approximately normal to the planes of said layers. Within a given layer the molecules may be organized in uniform rows, or randomly distributed throughout the layer, but in either case the major axes are still approximately normal to the plane of the layer. The attractive forces between layers are relatively weak so that the layers are free to move in relation to each other, thereby providing the smectic liquid crystalline substance with the mechanical properties of a planar or two-dimensional, soap-like fluid.

In the cholesteric structure, the molecules are believed to be arranged in definite layers as in the smectic structure; however, within a given layer, the molecules are believed to be arranged with their major axes approximately parallel in a fashion resembling the structure of nematic liquid crystals. Because of major axes of the molecules in the cholesteric structure are believed to be parallel to the planes of the layers, the molecular layers are very thin. The cholesteric structure derives its name from the fact that materials exhibiting the cholesteric liquid crystalline structure typically have molecules which are derivatives of cholesterol or which are shaped very similarly to molecules of cholesterol. Because of the shape of the cholesteric molecule, in the cholesteric structure the direction of the major axes of the molecules in each of the aforementioned thin layers is displaced slightly from the direction of the major molecular axes in the adjacent molecular layers. When compared to a hypothetical straight line axes passing through a cholesteric liquid crystalline substance and perpendicular to the molecular planes within said substance, the angular displacement of the direction of the molecular axes within each adjacent molecular layer traces out a helical path around the hypothetical straight line axis.

Cholesteric liquid crystals are known to be responsive to electrical fields (see Harper, W. J., "Voltage Effects in Cholesteric Liquid Crystals," in Molecular Crystals, Vol. 1, 1966, pages 325–332). The effects of an electrical field upon a sample of a liquid crystalline substance have typically been observed in a cell comprising a film of liquid crystals sandwiched between transparent electrodes, as disclosed, for example in co-pending application Ser. No. 646,532, filed June 16, 1967, now U.S. Pat. No. 3,804,618 and French Pat. No. 1,484,584. In both of these references liquid crystals are used for imaging in response to electrical fields. The imaging in prior art devices has typically comprised modification of the optical properties of the liquid crystalline substance maintaining its original liquid crystalline mesophase form, i.e., smectic, nematic, or cholesteric. Recently, however, NMR spectral studies have shown that a magnetic field may cause a cholesteric liquid crystalline substance to go through a phase transition to the nematic liquid crystalline structure (see Sackmann, Meiboom, and Synder, "On the Relation of Nematic to Cholesteric Mesophases," in J. Am. Chem. Soc., 89:73, November 8, 1967). Also, U.S. Pat. No. 3,652,148, Wysocki et al., discloses the application of an electrical field to transform a cholesteric liquid crystal to a nematic liquid crystalline structure.

Recently, Haas et al., U.S. Pat. No. 3,687,515 disclosed an electro-optic system wherein a layer of spontaneously homeotropic textured optically uniaxial nematic liquid crystalline composition with the optic axis normal to the plane of the layer was rendered optically biaxial by the application of an electrical field perpendicular to the uniaxial optic axis. When the field is removed, the composition naturally relaxes back into its optically uniaxial, homeotropic texture.

In new and growing areas of technology such as liquid crystalline imaging systems, new methods, apparatus, compositions, and articles of manufacture are often discovered for the application of the new technology in a new mode. The present invention relates to a new and advantageous system for imaging a liquid crystalline imaging member.

SUMMARY OF THE INVENTION

It is, therefore, an object of this invention to provide a novel electro-optic system.

It is another object of this invention to provide a novel imaging system.

It is another object of this invention to provide a novel liquid crystalline imaging system having improved speed and contrast.

It is another object of this invention to provide a liquid crystalline system that is quickly driven by applied electric fields from one optically uniaxial state having an optic axis in one direction to another optically uniaxial state having an optic axis substantially normal thereto.

It is still another object of the invention to use the electric field driven optically uniaxial state changes in novel electro-optic cells and imaging cells.

The foregoing objects and others are accomplished in accordance with this invention by providing a liquid crystalline composition having the optical uniaxiality characteristic of the nematic mesophase structure, applying a first electric field substantially perpendicular to the optic axis thereof to provide an optically uniaxial liquid crystalline composition having its optic axis in alignment with said field, and subsequently applying a second electrical field substantially perpendicular to said first field to re-align the optic axis of the composition into substantially its original position; i.e., substantially parallel to the re-applied field. The first and second fields may be applied repetitively, in turn, to cause fast repetitive switching between the two optically uniaxial states. Electro-optic cells and imaging systems using the field driven change between the optically uniaxial states are also a part of the present invention.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

Figure 1:
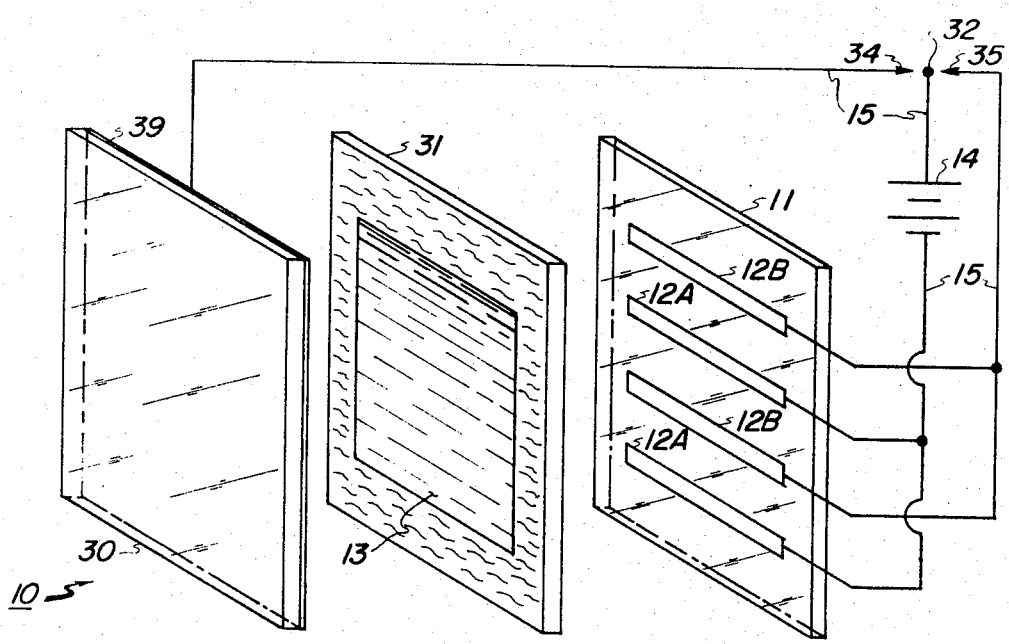
FIG. 1 is a partially schematic, exploded isometric view of an electro-optic cell embodying the present invention.

In FIG. 1 an embodiment of the novel electro-optic cell 10 of the present invention is shown in partially schematic, exploded isometric view. A pair of substantially transparent plates 11 and 30 are separated by a spacer 31, and the layer of liquid crystalline composition 13 having optical uniaxiality occupies the volume defined by the plates 11 and 30. Substantially transparent plate 30 has a substantially transparent conductive coating 39 upon its contact surface, i.e., the surface in contact with liquid crystalline composition 13. A strip of insulating gasket-type material is used to close the ends of this small volume and to define the layer of liquid crystalline composition 13, to contain the composition within the volume between the plates 11 and 30 and the electrodes 12A and 12B. In operation, the cells are typically electrically connected by leads 15 to a suitable voltage source such as potential difference source 14 and to a switch such as, for example, switch 32 intermediate contacts 34 and 35. As seen in FIG. 1, when switch 32 is in electrical connection with contact 34, electrodes 12A on the surface of substantially transparent plate 11 are connected to one polarity of voltage source 14 with the electrode 39 on the contact surface of substantially transparent plate 30 being connected to the other polarity of voltage source 14. When switch 32 is in electrical contact with contact 35, electrodes 12B on substantially transparent plate 11 are connected to said other voltage source 14 polarity. Thus it can be seen by means of switch 32, a potential difference with accompanying electrical fields exists between electrodes 12A and electrode 39 (contact 34), or, potential differences with accompanying electrical fields exists between electrodes 12A and 12B (contact 35).

In the electro-optic cells described herein, the substantially transparent plates 11 and 30 may comprise any suitable substantially transparent material. For example, glass; polyethylene; polyvinylchloride; Mylar, a polyester resin film available from DuPont; Teflon, a polytetrafluoroethylene film available from DuPont; or any other suitable substantially transparent material may be used.

The electrodes 12 and 39 may comprise any suitable electrically conductive material. Such electrical conductors will typically have electrical resistivities in the range between about $10^{-8}$ and about $10^{-3}$ ohm-cm, although materials having resistivities outside this range will perform satisfactorily in various embodiments of the present invention. Typical conductive materials suitable for use as electrodes herein include aluminum, copper, silver, gold, tin oxide, chromium and others. The thickness of the electrodes is typically not greater than about 250 microns. The individual cells in the present invention are typically of width not greater than about 50 millimeters. Within this range, narrow individual cells or combinations thereof are preferable for use in high resolution imaging or display systems.

Where it is desirable to use a strip of gasket-like material at the ends of the volume defined by the electrodes and the transparent surfaces, or in any other suitable fashion, any suitable substantially electrically insulating material may be used. Preferred gasket materials will typically be chemically inert and possess the appropriate dielectric characteristics. Materials suitable for use as insulating gasket materials include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate, mixtures thereof, and others.

Any liquid crystalline substance or composition which will either exhibit in response to external stimuli, or inherently has, the optical uniaxiality of the uniaxial nematic mesophase may be used.

Typical suitable materials which will exhibit optical uniaxility in response to external stimuli include cholesterics; mixtures of cholesterics and smectics; mixtures of nematics and cholesterics, such as about 80 percent by weight methoxybenzylidene-p-n-butylaniline (MBBA) and 20 percent cholesteryl chloride (CC); and mixtures of nematics and optically active non-mesomorphic materials such as l-menthol; or d-camphor. These materials and mixtures typically exhibit optical characteristics of the cholesteric mesophase and will undergo phase transformation to the optically uniaxial nematic mesophase state in response to suitable stimuli such as, for example, electrical field induced phase transformation as disclosed in U.S. Pat. No. 3,652,148 hereby incorporated by reference. Also, nematics will assume the optically uniaxial state in response to electric fields and in response to substrate treatment, such as rubbed substrates, as disclosed in P. Chatelain, Bull, Soc. Fr. Miner. Crist. 66,105 (1943).

Typical suitable materials which inherently exhibit optical uniaxiality include doped nematics as disclosed in U.S. Pat. No. 3,687,515 hereby incorporated by references and compensated mixtures of cholesterics.

Typical suitable liquid crystalline compositions which may be used alone or in combination to achieve the characteristics desired in liquid crystalline composition 13 are listed in U.S. Pat. No. 3,622,224, Wysocki et al., especially column 3, line 18 through column 4, line 62; which patent is hereby incorporated by reference. Typical suitable liquid crystalline compositions which may be used alone or in combination to achieve the desired characteristics of liquid crystalline composition 13 are also listed in U.S. Pat. No. 3,652,148, Wysocki et al., especially column 4, line 59 through column 5, line 26, and U.S. Pat. No. 3,687,515, Haas et al.; especially column 3, line 59 through column 4, line 62, both of which patents are hereby incorporated by reference.

The phrase "providing a layer of liquid crystalline composition having the optical properties of the nematic mesophase optical uniaxial state" is used herein to include the above enumerated means of achieving the desired uniaxial characteristc and equivalents thereof; and specifically, to include the electrical field induced phase transition from the cholesteric to the nematic mesophase.

Cholesteric liquid crystals have been found to have the property that when the propagation direction of plane polarized or unpolarized light is along the helical axis thereof, i.e., when the light enters in the direction perpendicular to the long axes of the molecules, white light is essentially unaffected in transmission through thin films of such liquid crystals except for a wavelength band centered about some wavelength $\lambda o$ where $\lambda o = 2np$ with $n$ representing the index of refraction of the liquid crystal substance and $p$ the pitch or repetition distance of the helical structure. The bandwidth $\Delta \lambda$ of the wavelength band centered about $\lambda o$ will typically be of the order of about $\lambda o/14$. For light of a wavelength $\lambda o$, the cholesteric liquid crystal, under these conditions, exhibits selective reflection of the incident light such that approximately 50 percent of the light is reflected and approximately 50 percent is transmitted (assuming negligible absorption which is usually the case) with both the reflected and transmitted beams being approximately circularly polarized. For light having wavelength around $\lambda o$ but not at $\lambda o$ the same effect is present but not completely. The transmitted light is not circularly polarized but instead is elliptically polarized. The cholesteric liquid crystals which exhibit this property of selective reflection of light in a region centered about some wavelength $\lambda o$ are said to be in the Grandjean or "disturbed" texture. If $\lambda o$ is in the visible spectrum the liquid crystalline film appears to have the color corresponding to $\lambda o$ and, if $\lambda o$ is outside the visible, the film appears to be colorless.

Furthermore, depending upon the intrinsic rotary sense of the helical nature of the material, i.e., whether it is right-handed or left-handed, the light that is transmitted is either right-hand circularly polarized light (RHCPL) or left-hand circularly polarized light (LHCPL). The transmitted light is circularly polarized with the same sense of polarization as that intrinsic to the helical nature of the material. Thus a cholesteric liquid crystal having an intrinsic helical structure which is left-handed in sense will transmit LHCPL and one having a helical structure which is right-handed in sense will transmit RHCPL.

Hereinafter these cholesteric liquid crystal substances will be identified in accordance with popular convention, by the kind of light which is reflected at $\lambda o$. When a film is said to be right-handed it is meant that it reflects RHCPL and when a film is said to be left-handed it is meant that it reflects LHCPL.

Thus, a right-handed cholesteric liquid crystal substance transmits LHCPL essentially completely at $\lambda o$ whereas the same substance reflects almost completely RHCPL. Conversely, a left-handed film is almost transparent to RHCPL at $\lambda o$ and reflects LHCPL. Since plane polarized or unpolarized light contain equal amounts of RHCPL and LHCPL, a cholesteric liquid crystal film is approximately 50 percent transmitting at $\lambda o$ for these sources when the liquid crystal is in its Grandjean texture.

It has been found that compensated cholesteric liquid crystal mixtures (mixtures of right and left handed components adjusted to approach or give pitch) can adopt spontaneously an optical uniaxial configuration with the optic axis substantially perpendicular to the plane of the liquid crystal; such as, for example, a 50–50 percent by weight mixture of cholesteryl chloride and oleyl cholesteryl carbonate. Compensated cholesterics used as liquid crystalline composition 13 may be driven by electric fields from the ON to the OFF imaging state by the device in FIG. 1. However, the compensated cholesteric mixtures will reorient themselves into the configuration having the optic axis substantially perpendicular to the plane of the mixture upon removal of any applied field substantially parallel to the mixture plane which causes orientation of the optic axis parallel to the mixture plane. Therefore, the electro-optic cell shown in FIG. 2 can be used for such compensated cholesteric mixtures. The FIG. 2 cell is similar to, and may be identical with, the FIG. 1 cell with the exception that the FIG. 2 cell lacks the electrode 39 of the substantially transparent plate 30 and spacer 31. Another exception is that, in the absence of spacer 31, the electrodes 12A and 12B may be placed on edge to better retain the liquid crystalline composition 13.

It is preferred to use electrical fields in driving the liquid crystalline composition between the two optically uniaxial ON and OFF states, even with compensated cholesterics or homeotropic textured nematics, because the natural relaxation time for such materials is typically relatively large. For example, the natural relaxation time can vary for different compositions up to about 20 seconds, whereas the field driven position change in optic axis takes from about 1 to about 100 milli-seconds; i.e., with a cycle defined as from ON to OFF to ON, the field driven system of the present invention can achieve speeds greater than 500 cycles per second. The fastest natural relaxation cycling is generally around 20 cycles per second. Accordingly, for fast switching operations, even with compensated cholesterics or homeotropic textured nematics, the FIG. 1 cell is preferred over the FIG. 2 cell. As seen from FIG. 3 the advantageous effect of the present invention is typically observed through an analyzer or polarizer with linearly polarized and collimated light. The light is preferably monochromatic. The source of light may be intrinsically emit polarized and collimated light such as, for example, lasers; in which case only the analyzer or polarizer 22 is needed. Or, the light source may be either a monochromatic or white light source of light passed through a collimator and polarizer such as, for example light source 17 and collimator 18 positioned normal to the plane of the layer of liquid crystalline composition 13. The collimated light is then passed through a polarizer 19 and the plane polarized light, here transmitted along line 20, enters the electro-optic cell perpendicular to the optic axis of the liquid crystalline composition 13 when switch 32 is in electrical connection with contact 35 and switch 33 is an electrical connection with contact 37. These positions for switches 32 and 33 create potential differences and associated electrical fields between each of electrodes 12A and electrodes 12B. This creates one or more electrical fields parallel to the plane of liquid crystalline composition 13, aligning the major axis of the molecules of layer 13 parallel to the plane of layer 13. Liquid crystalline composition 13, under the influence of the parallel electrical field, is now optically uniaxial and has its optic axis parallel to the plane of layer 13. An observer 21, on the opposite side of the electro-optic cell, observing the cell through polarizer 22, oriented 90° with respect to polarizer 19, in the direction normal to the plane of layer 13 and perpendicular to the optical axis of liquid crystalline composition 13, will observe that the field of view has a maximum brightness when the crossed polarizers make an angle of 45° with the parallel electrical field. The electro-optic cell is in its ON imaging state. To turn the electro-optic cell to its OFF imaging state, switch 32 is placed in electrical connection with contact 34 to create an electrical field between electrode 39 and electrodes 12B. Alternatively, a sliding contact 38 may be placed in electrical connection with voltage source 14 by making electrical connection between switch 33 and contact 36; and by placing sliding contact bar 38 in connection with all leads connected to electrodes 12A and 12B, provide an electrical field perpendicular to the plane of layer 13 across a greater area of layer 13. The perpendicular electrical field causes the liquid crystalline composition 13 to have the major axes of its molecules substantially parallel to each other but now oriented perpendicular to the plane of layer 13. The optic axis of liquid crystalline composition 13, now under the influence of the perpendicular electrical field, has its optic axis perpendicular to the layer 13. If the observer 21 were to view the electro-optic cell as he did previously, his direction of view is now parallel to the optic axis of liquid composition 13, and the observer will find that the field of view is extinguished for all orientations of the polarizer and analyzer. That is, the liquid crystalline composition 13 now appears uniformly black. The electro-optic cell is, therefore, in its OFF imaging state. It will be noted in FIG. 3, that gasket 31 is provided to assist in containing and confining the liquid crystalline composition 13 between electrode 39 and the substantially transparent plate 11.

Preferred field strengths are from about $10^3$ to about $10^5$ volts per centimeter; preferred electrode thickness is from about 50A. to about $10\mu$; and preferred layer thickness for the liquid crystalline composition is from about $1\mu$ to about $50\mu$. The applied potential used in creating the electrical fields may be either D.C., A.C., or combinations thereof.

Figure 2:
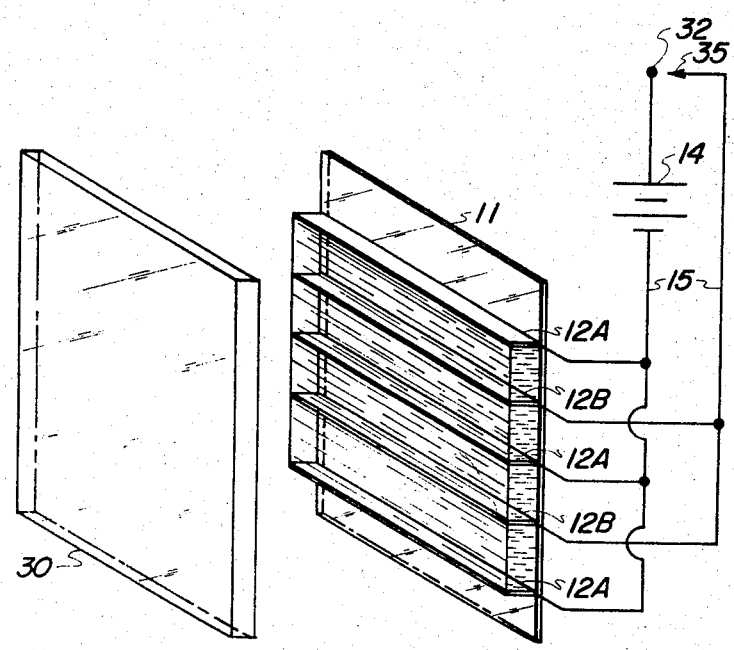
FIG. 2 is a partially schematic, isometric view of another electro-optic cell embodying the present invention.
Figure 3:
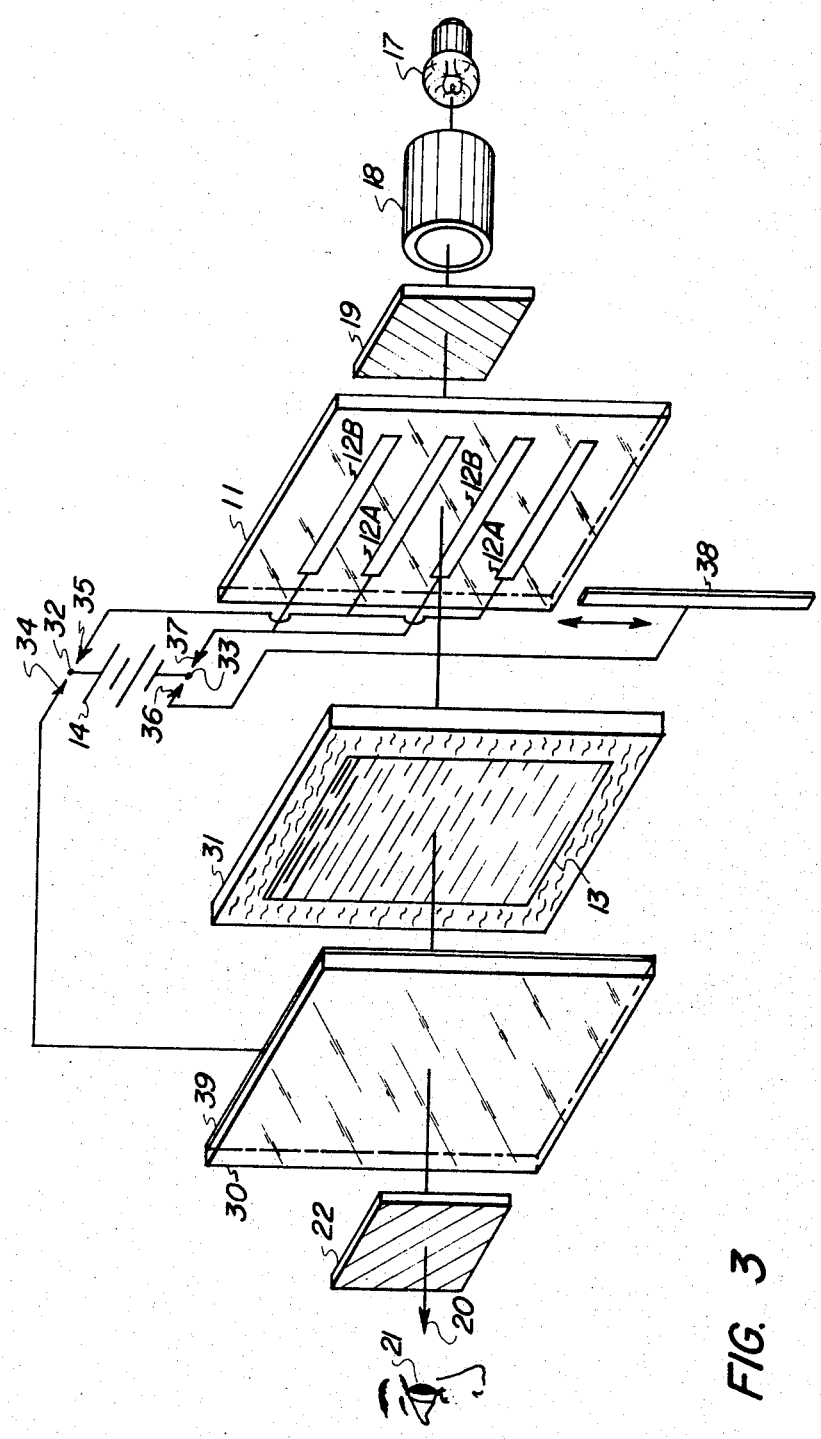
FIG. 3 is a partially schematic, exploded isometric view of an imaging system embodying the present invention.

Although individual electro-optical cells have been described in conjunction with FIGS. 1–3, it will be appreciated that grids or bit-matrices of coplanar electro-optic cells embodying configuration can be provided to exhibit the novel effect of the present invention.

The following examples further specifically define the present invention with respect to liquid crystalline compositions, electro-optic cells and imaging systems, wherein the optically uniaxial liquid crystalline composition is driven by D.C. electrical fields from a uniaxial state wherein its optic axis is in a predetermined position to a second uniaxial state wherein it optic axes is substantially perpendicular to its former position. The parts and percentages are by weight unless otherwise indicated. The examples below are intended to illustrate the preferred embodiments of the novel liquid crystalline electro-optic system.

EXAMPLE I

An electro-optic cell is constructed using a microscope slide of dimensions of about 3 inches by 1 inch by 0.05 inch. Chromium interdigitated electrodes are formed by vacuum evaporation of chromium to a thickness of about 100 angstroms, creating an interdigitated pattern in an overcoating of photoresist so that each electrode in the interdigitated electrode pattern is approximately 10 mils wide and the spacing between individual electrodes in the interdigitated electrode pattern is about 10 mils. The chromium coating in non-patterned areas is removed by acid etching. Two such interdigitated chromium electroded microscope slides are prepared in this manner and provided with suitable electrical connection with a voltage source so that electrical fields can be established between individual electrodes on each slide or electrical fields can be established between the electrodes on one slide and those of the second slide. A cholesteric liquid crystalline mixture of about 60 percent cholesteryl chloride and about 40 percent cholesteryl nonanoate is placed on the electroded side of one of the slides within a spacer gasket of Mylar polyester resin film available from DuPont and about 1 mil thick. The spacer resides on the electroded surface of the glass slide and is located along its entire periphery so as to contain the liquid crystalline placed therein. The second electroded glass slide is placed electrode side down in contact with the liquid crystalline composition and with its electrodes in registry with the electrodes of the first slide. The liquid crystal mixture normally appears as a light scattering, white opalescent, translucent sheet. A voltage of about 90 volts is applied from the voltage source across the thickness of the liquid crystalline composition creating an electrical field having a field strength of about 4 times $10^4$ volts per centimeter. In the presence of this field, the image proportion of the liquid crystalline layer assumes a colorless, transparent appearance. With the field applied, the imaging member is viewed with a linear analyzer while plane-polarized light is normally incident on the imaging member. By viewing with the linear analyzer, the optical negative-positive, cholesteric nematic transition is observed because it is impossible to extinguish field of view with the linear analyzer when the cholesteric liquid crystal composition is viewed with plane-polarized light incident before the phase transition takes over. After the plane transition takes place, the normally incident, plane-polarized light emerges plane-polarized through the electrical field-induced areas and may be extinguished when viewed with the linear analyzer. The applied field of about 90 volts represents the threshold level at which transition from the cholesteric to the nematic mesophase occurs. At or above this threshold level of electrical field, the now nematic-like liquid crystalline composition may be driven by electrical fields and cycled between ON and OFF states by alternately applying the electrical fields across the thickness of the composition and across the width of the composition. The applied voltage across the liquid crystalline composition is switched to an application between the individual electrodes on each slide so that electrical fields exists therebetween. The imaging member is now again viewed from a linear analyzer while plane-polarized light is normally incident on the imaging member and birefringence is observed. The presence of birefringence demonstrates that the molecules of the liquid crystalline composition have been rotated. The rotation is substantially 90° and is parallel to the plane of the liquid crystalline composition. This can be shown by viewing with a linear analyzer plane-polarized light transmitted through the liquid crystalline composition and parallel to the plane thereof. The plane-polarized light emerges through the liquid crystalline composition and may be extinguished when viewed with the linear analyzer. The liquid crystalline composition is shown by conoscopic observation to be uniaxial with the optic axis parallel to the applied electric field by viewing the liquid crystalline composition under the influence of both applied fields. The optic sign of the liquid crystalline composition is positive under both applied fields, i.e., light travels fastest in the direction of the optic axis.

The electro-optic cell is then placed under a Leitz Dialux microscope between crossed polarizers. In parallel or collimated transmitted light, the cell appears dark in all stage positions when the liquid composition has the electric field applied across its thickness; and, has a maximum brightness when the electrical field is applied between the individual electrodes of each respective slide and the crossed polarizers make a 45° angle with the field direction between the individual electrodes on each glass slide. The crossed polarizers are left in the position wherein they make an angle of 45° with the field direction applied between individual electrodes on each glass slide, so that when the electric field is switched to extend across the thickness of the liquid crystalline imaging layer the cell appears dark through the cross polarizers and is thus in an "OFF" imaging state. Conversely, when the electrical field is switched to exist between individual electrodes on each glass slide, maximum brightness is observed through the crossed polarizers in areas of the liquid crystalline composition wherein the electrical field exists, and the cell is in its ON imaging state.

A photodiode is then substituted for the eye of the observer, connected to an oscilloscope and both are calibrated so that collimated light striking the photodiode registers as an intensity level on the oscilloscope. During repeated switching of the electrical field, the electro-optic cell is repeatedly switched from an imaging ON to an imaging OFF state, the oscilloscope traces a square wave for each time the cell is on. The photodiode and oscilloscope combination provides a convenient way of measuring cycle speed, i.e., the time it takes to go from OFF to ON to OFF or from ON to OFF to ON. The reciprocal of the cycle time yields the number of cycles per second at which the electro-optic cell is operating. With the application of 90 volts from the voltage source and repeated switching it was determined that a cycle speed of about 2 seconds is possible. The electrical field strength between the individual electrodes on each glass slide is about 4 times $10^3$ volts per centimeter. The electrical field strength across the thickness of the liquid crystalline composition is about 4 times $10^4$ volts per centimeter. Thus, with this configuration of 10 mils spacing between individual electrodes on each glass slide it is seen that the lower level electrical field strength exists between individual electrodes on the same glass slide when the electro-optic cell is turned to its ON imaging state and thus constitutes the slowest path of the cycle. With an applied voltage of 90 volts and with rapid switching between the imaging ON and OFF states, it was determined that the cycle time for the cell was about 2 seconds.

EXAMPLE II

The electro-optic cell and imaging system of Example I is operated at 100 volts and with rapid switching between the imaging ON and OFF states has a cycle time of about 0.5 seconds; i.e., it can operate at a speed of about 2 cycles per second.

EXAMPLE III

The electro-optic cell and imaging system of Example I is operated at a voltage of 200 volts and with rapid switching between the imaging ON and OFF states it is determined that a maximum cycle speed of about 0.1 seconds is achieved; i.e., the imaging speed is about 10 cycles per second.

EXAMPLE IV

Example I is followed except that the applied voltage is 600 volts; the cycle speed is 10 milliseconds and the imaging speed is 100 cycles per second.

EXAMPLE V

Example I is followed except the applied voltage is 700 volts; the cycle speed is about 5 milliseconds; and the imaging speed is about 200 cycles per second.

EXAMPLE VI

A compensated cholesteric liquid crystalline mixture of about 50 percent cholesteryl chloride and 50 percent oleyl cholesteryl carbonate which spontaneously adopts a uniaxial configuration with the optic axis being perpendicular to the substrate to which the mixture is applied, is placed in an electro-optic cell configured according to FIG. 2. An applied potential of about 50 volts creates an electrical field strength between electrodes 12A and 12B of FIG. 2 of about 2.2 times $10^4$ volts per centimeter. Electrodes 12A and 12B are about 1 mil high with a spacing of about 10 mils between each of the electrodes. When the electrical field is applied such as, for example, making electrical connection between switch 32 and contact 35 of FIG. 2, the electro-optic cell is in its imaging ON state. When the electrical field is turned OFF such as for example, by disengaging switch 32 from contact 35, the cholesteric liquid crystalline mixture spontaneously aligns into its original position wherein the electro-optic cell is in its imaging OFF state. The optical tests of Example I are repeated to indicate that the compensated cholesteric liquid crystalline mixture is optically uniaxial with its optic axis perpendicular to the glass slide 11. Conversely, when the electrical field is applied, the compensated cholesteric liquid crystalline mixture is optically uniaxial with its optic axis parallel to the glass slide 11 and in the direction of the applied field and is in its imaging ON state. Again, maximum brightness is observed when the crossed polarizers make an angle of about 45° with the electrical field direction. The imaging speed is quite slow, however, because of the relatively long relaxation time to the imaging OFF state when the applied electrical field is removed.

EXAMPLE VII

Example VI is followed except that the electro-optic cell of FIG. 1 is used so that the liquid crystalline composition of Example VI may be driven by electrical fields between the imaging ON and imaging OFF states. Imaging speeds comparable to those of Examples I – V are obtainable at lower applied voltages than those used in said Examples due to the lack of need of operating at or above the threshold level for cholesteric to nematic phase transition.

EXAMPLE VIII

Example I is followed except that the applied voltage is 500 volts and the spacing between individual electrodes on each of the glass slides is only about 1 mil, instead of 10 mils. Imaging speeds of about 500 cycles per second are obtained with electrical breakdown occurring at higher applied voltages.

Although specific components and proportions have been stated in the above description of the preferred embodiments of the advantageous liquid crystalline electro-optic system of the present invention, other suitable materials and variations of the various steps in the system as listed herein maybe used with satisfactory results and various degrees of quality. In addition, other materials and steps may be added to those used herein and variations may be made in the process to synergize, enhance or otherwise modify the properties of or uses for the invention. For example, various other liquid crystalline compositions which are suitable for use in the present invention by having the desired capability of being or becoming optically uniaxial and exhibiting the desired optical properties may be discovered and used in the system of the present invention and such compositions may require somewhat different thicknesses, electrical fields, temperature ranges and other conditions for preferred results with the present invention. Likewise, the various other means of creating electrical fields and other means of addressing the inventive imaging system may be used with satisfactory results.

It will be understood that various changes in the details, materials, steps and arrangements of elements which have herein been described and illustrated in order to explain the nature of the invention, will occur to and may be made by those skilled in the art, upon a reading of this disclosure and such changes are intended to be included within the principle and scope of this invention.

What is claimed is:

1. An electro-optic method, comprising:
   a. providing a layer of liquid crystalline substance having the optical properties of the nematic mesophase optical uniaxial state;
   b. applying a first electrical field substantially normal to the optic axis of said substance, wherein the optic axis of said substance is rotated substantially parallel to said first electrical field; and
   c. removing said first electrical field and then applying a second electrical field substantially normal to the direction of said first electrical field, wherein the optic axis is rotated substantially parallel to said second electrical field.

2. The method of claim 1 wherein said step (a) comprises providing a liquid crystalline substance exhibiting phase transformation characteristics of the cholesteric mesophase, said substance being under the influence of an applied electrical field at or above the cholestericnematic phase transition level for said material, and wherein said first and second electrical fields in steps (b) and (c) respectively, are applied at or above said phase transition level.

3. The method of claim 2 wherein said liquid crystalline substance exhibiting phase transformation characteristics of the cholesteric mesophase comprises a cholesteric liquid crystalline material.

4. The method of claim 3 wherein said liquid crystalline substance further comprises a nematic liquid crystalline material.

5. The method of claim 4 wherein said liquid crystalline substance comprises by weight about 80 percent methoxybenzylidene-p-n-butylaniline and about 20 percent cholesteryl chloride.

6. The method of claim 3 wherein said liquid crystalline substance further comprises a smectic liquid crystalline material.

7. The method of claim 2 wherein said liquid crystalline substance exhibiting phase transformation characteristics of the cholesteric mesophase comprises a mixture of a nematic liquid crystalline material and an optically active non-mesomorphic material.

8. The method of claim 7 wherein said optically active non-mesomorphic material is selected from the group consisting of l-menthol and d-camphor.

9. The method of claim 2 wherein said steps (a), (b) and (c) applied electrical fields have an electrical field strength of from about $10^3$ to about $10^5$ volts per centimeter.

10. The method of claim 2 wherein said liquid crystalline substance comprises a mixture by weight of about 60 percent cholesteryl chloride and about 40 percent cholesteryl nonanoate.

11. The method of claim 1 wherein said liquid crystalline substance comprises a compensated cholesteric liquid crystalline mixture.

12. The method of claim 11 wherein said compensated cholesteric liquid crystalline mixture comprises about 50 percent by weight cholesteryl chloride and about 50 percent by weight oleyl cholesteryl carbonate.

13. The method of claim 1 wherein said liquid crystalline substance comprises a nematic which spontaneously aligns.

14. The method of claim 1 further including, after sequential performance of steps (b) and (c), the step of repeating sequentially steps (b) and (c) at least once.

15. The method of claim 14 wherein steps (b) and (c) are repeated at a rate which produces an imaging speed of from between about 1 to about 500 cycles per second.

16. The method of claim 15 wherein said imaging speed is from about 100 to about 200 cycles per second.

17. The method of claim 1 additionally comprising providing the liquid crystalline composition between polarizers.

18. The method of claim 17 wherein said polarizers are crossed at about 90° and make an angle of about 45° with at least one of the electrical fields applied in steps (b) and (c).

19. The method of claim 1 wherein said liquid crystalline substance is in layer configuration having a layer thickness from about 1 micron to about 50 microns.

20. The method of claim 1 wherein said electrical fields in steps (b) and (c) have an electrical field strength of from about $10^3$ to about $10^5$ volts per centimeter.

21. The method of claim 1 wherein said electrical fields in steps (b) and (c) are applied between electrodes in contact with said liquid crystalline substance and wherein said electrode thicknesses are from about 50 angstroms to about 10 microns.

* * * * *